(12) United States Patent
Mitchell et al.

(10) Patent No.: US 6,652,213 B1
(45) Date of Patent: Nov. 25, 2003

(54) AUTOMATED WAREHOUSING SYSTEM AND METHOD

(75) Inventors: Pat R. Mitchell, Stockton, CA (US); Kevin A. Haslebasher, Oakdale, CA (US)

(73) Assignee: California Natural Products, Lathrop, CA (US)

( * ) Notice: Subject to any disclaimer, the term of this patent is extended or adjusted under 35 U.S.C. 154(b) by 0 days.

(21) Appl. No.: 09/658,703

(22) Filed: Sep. 8, 2000

(51) Int. Cl.$^7$ .............................. B65G 1/12; B65G 1/04
(52) U.S. Cl. .................. 414/284; 414/279; 414/286
(58) Field of Search ................. 414/279, 284, 414/286, 283

(56) References Cited

U.S. PATENT DOCUMENTS

| | | | | |
|---|---|---|---|---|
| 3,738,506 A | * | 6/1973 | Cornford et al. | 414/283 |
| 3,973,685 A | * | 8/1976 | Loomer | 414/284 X |
| 4,328,422 A | * | 5/1982 | Loomer | 414/284 X |
| 4,459,078 A | * | 7/1984 | Chiantella et al. | 414/279 |
| 4,470,742 A | * | 9/1984 | Schindler | 414/286 |
| 4,505,630 A | * | 3/1985 | Kaschner et al. | 414/284 X |
| 4,553,896 A | * | 11/1985 | Yoshida | 414/495 |
| 4,732,524 A | | 3/1988 | Suominen | 414/267 |
| 5,388,955 A | * | 2/1995 | Schroder | 414/279 |
| 5,421,685 A | * | 6/1995 | Elmer et al. | 414/283 |
| 5,445,485 A | * | 8/1995 | Poutet | 414/286 X |
| 5,664,928 A | * | 9/1997 | Staubler | 414/286 X |

FOREIGN PATENT DOCUMENTS

| | | | | |
|---|---|---|---|---|
| JP | 11-72103 | * | 7/1989 | 414/286 |
| JP | 42-60511 | * | 9/1992 | 414/284 |

* cited by examiner

Primary Examiner—Steven A. Bratlie
(74) Attorney, Agent, or Firm—Robert Charles Hill

(57) ABSTRACT

An automated warehouse system for a building has elevators for automatically accepting incoming material on pallets. A rotating forklift mounted inside the elevator extends its forks to reach out and bring in the pallets. Once inside, the rotating forklift spins around to face inside warehouse doors. When the elevator car arrives at a designated level, the rotating forklift deposits the material on the pallet on a temporary shelf just outside the elevator. Each level has an aisle cart that moves along an aisleway for both a loading elevator and an unloading elevator. Each aisleway is intersected by several row rails that are right angles to the aisleway. The aisle cart carries a battery powered row cart that can run back and forth along the rows. The aisle cart is positioned at the appropriate row along the aisleway, and the row cart carries, deposits, and picks up material on pallets. Storage positions are provided along each row, front to rear. The palleted items are shuffled on a carousel between walking conveyors and elevators. Conveyor carts ride the carousel on parallel adjacent tracks and transfer track.

11 Claims, 7 Drawing Sheets

AUTOMATED WAREHOUSING SYSTEM AND METHOD

BACKGROUND OF THE INVENTION

1. Field of the Invention

The present invention relates to automated storage and retrieval systems (AS/RS), and more particularly to material handling systems for storing and accessing palletized material in large multi-story automated warehouse buildings.

2. Description of Related Art

Automated warehouses and automated storage and retrieval systems (AS/RS) can reduce costs, pilferage, and damage because far fewer workers are needed for otherwise similar operations.

Retrotech Incorporated (Fishers, N.Y.) markets various automated warehouse systems and material handling robots. One such system, ACTIV™ is a mechanized material handling automation technology for continuous product flow. Loads are not assigned a location within a system, rather they are assigned a dynamic path into and subsequently through the system using a transport design that overcomes the limitations of conventional deep lane storage. The technology was originally marketed in Europe under the tradename ACTIV™ by Naaraharju Oy in Finland. Typical applications for ACTIV™ include existing warehouses which had their manufacturing sources nearby, and the packaging and palletizing lanes, loading docks, and other services were already in place.

But, the Retrotech system and other conventional approaches bog down and become very inefficient as the design capacity is reached. Users cannot immediately access every and any pallet of product without having to "dig through" others to get to it. Systems like the Retrotech system have carts "slaved together" in groups that are constantly moving. Only one in the group is doing any useful work at any one time. U.S. Pat. No. 4,732,524, issued Mar. 22, 1988 to Seppo Suominen, describes some of the details found in the Retrotech systems. One of the disadvantages of this system include that the carts' winch cables stretch and their drums wear out, and this affects the carts' ability to stop at the proper location. Another disadvantage is that this system requires a high degree of maintenance.

It is also advantageous for any AS/RS system to be able to handle a wide variety of pallets. Some conventional systems are very particular about the pallets that can be used. If ordinary and inexpensive pallets could be utilized, the potential savings in pallet costs can amount to over $200,000 per year in a 10,000 pallet system.

In the Retrotech system, a pallet can be moved ten to thirty times before it is finally shipped out. Such excessive handling can cause unnecessary damage to the product, and may shift the load on the pallet making it unstable.

SUMMARY OF THE INVENTION

An object of the present invention is to provide an automated storage and retrieval system that is economical to install and operate.

Another object of the present invention is to provide an automated storage and retrieval system that is efficient and has high throughput.

Another object of the present invention is to provide a system that uses minimal labor.

A further object of the present invention is to provide an automated storage and retrieval system that handles the pallets and their loads as little as possible between input and output.

A still further object of the present invention is to provide a system that can operate at 100% capacity with no loss in efficiency.

Briefly, an automated warehouse system embodiment of the present invention is contained within a warehouse building with at least one freight elevator. One such freight elevator and shaft automatically accepts incoming material on pallets. A rotating forklift-like attachment mounted inside the loading elevator can extend its forks to reach out and bring in material loaded on a standard pallet from a delivery system. Once inside the loading elevator, the rotating forklift is spun around to face inside openings on the various floors of the warehouse system. When the elevator arrives at a designated level, the rotating forklift extends out and deposits the material and pallet on a temporary support just outside the elevator. Each floor has a rail trolley that shuttles along an aisleway between temporary supports for both the loading elevator and an unloading elevator, which in some embodiments may be the same elevator. When both a loading and an unloading elevator are used, these elevators are at opposite ends of the aisleway. Each aisleway is intersected by several row rails that are perpendicular to the aisleway. The rail trolley or aisle cart carries a battery powered row cart on top of it that can run back and forth along the row rails. The aisle cart is positioned at a designated row along the aisleway, and the piggyback carrier or row cart then moves off the aisle cart down the designated row for the purpose of carrying, depositing, and picking up material on pallets. Storage position slots are provided along each row, front to rear.

An advantage of the present invention is that a system is provided that gives immediate access to any set of pallets. A set of pallets is defined as the total pallets in any particular row.

Another advantage of the present invention is that an AS/RS system is provided that permits high density storage. Each module can have multiple levels with minimal clearance between the levels. Most of the space in the module is used for storage with the only open space being the aisleways.

A further advantage of the present invention is that an AS/RS system is provided that permits fast storage and retrieval, e.g., up to six pallet movements per minute per module based on a six level system. This greatly increases the throughput of the system.

An advantage of the present invention is that a system is provided that has quick response times to movement orders. Since all pallets are highly accessible, a pallet can be retrieved and delivered to the docks in a short period of time.

A further advantage of the present invention is that an AS/RS system is provided that is completely controlled by computer software that is in charge of all functions of the system, and therefore can be easily customized to fit the needs of even unique applications. Such software also allows for complete accounting and status of the stored inventory, and this helps control costs and increase profitability.

A still further advantage of the present invention is that an AS/RS system is provided that uses simple reliable components to help keep maintenance costs down, requiring less personnel to perform maintenance duties. This captive system allows for complete control of inventory preventing damage, early shipment of unreleased product, misshipments and pilferage. Complete accounting and status of inventory helps control costs and increases profitability. No constant rearranging of the pallets for optimization is required and the system by its nature is always optimized.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
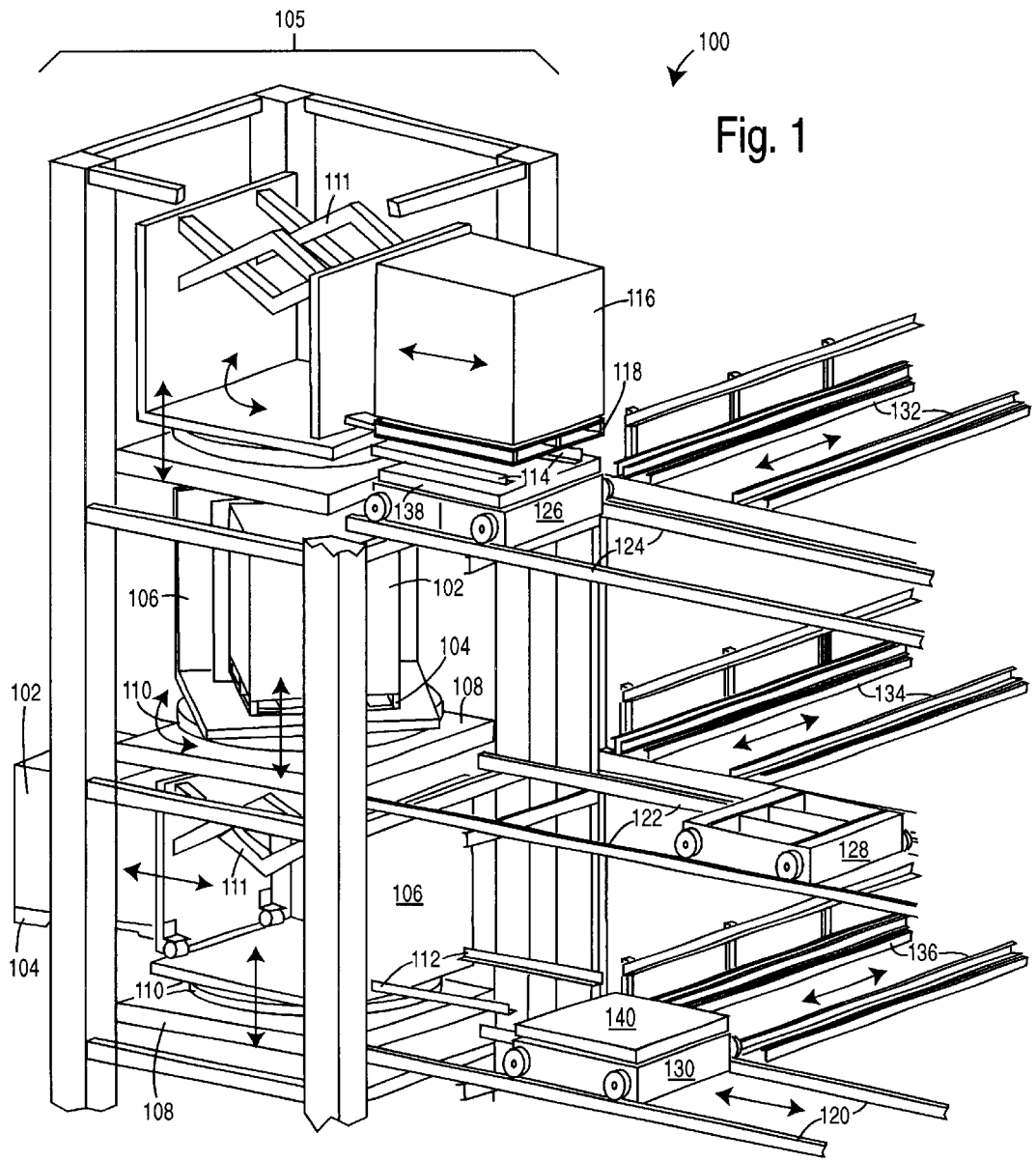
FIG. 1 is a perspective view of the loading elevator or material-input portion of a warehouse system embodiment of the present invention.

FIG. 1 partially illustrates a warehouse system embodiment of the present invention, referred to herein by the reference numeral 100. The warehouse system 100 is preferably installed in a high profile warehouse building with at least one freight elevator. A product 102 on a standard pallet 104 is lifted and retracted into a loading elevator shaft 105 by a rotating forklift-like attachment (FLA) 106. A uniform pallet size is desired for a specific system. For example, a "standard" pallet in a grocery application would be a Grocery Manufacturers Association (GMA) pallet 40"×48" with four way entry. An elevator car 108 supports a turntable 110 and the rotating FLA 106 which is mounted inside. The rotating FLA 106 can extend its forks to reach out and bring in or drop off product loaded on a standard pallet. For example, a scissors mechanism 111 allows an adequate reach to bring pallets in and out of the elevator car 108. Other types of mechanisms are also possible.

FIG. 1 shows three each of such rotating FLAs 106, elevator cars 108, and turntables 110, but in actual use only one such set would be present. These three sets are shown in FIG. 1 to illustrate the different phases of use that occur over time. The bottom set demonstrates incoming material being received. The middle set demonstrates the material being spun around and reoriented to face the warehouse system interior. The top set demonstrates the unloading of the elevator car and staging for transfer to the aisle cart.

Once the pallet 104 and product 102 are inside the loading elevator shaft 105, the rotating forklift 106 is spun around on the turntable 110 to face the interior levels of the warehouse system. When the pallet 104 and product 102 are transported and arrive at a particular level, the rotating FLA 106 extends out and deposits the product and pallet on a temporary support. An empty temporary pallet support 112 is shown on the bottom level as two opposing L-angle steel sections. A loaded temporary pallet support 114 is shown at the top level, also as two opposing L-angle steel sections (just below a product 116 and its pallet 118). Such pallet supports 112 and 114 allow the elevator to drop off its incoming load, and then go on to another task. The corresponding outgoing pallet supports (FIG. 2) allow the aisle carts to drop off their outgoing loads, and then return to a designated location for another task. It should be understood that the previous two functions can be accomplished with one universal elevator.

A set of three aisle railways 120, 122, and 124 are shown for the three levels visible in FIG. 1. These railways run between the loading elevator shaft 105 to a corresponding unloading elevator shaft (FIG. 3) on the same level. Where only a single or universal elevator is used, then these railways run from the elevator to the far end of the system. Each level has one aisle cart 126, 128, and 130 that shuttles along the aisle railways 120, 122, and 124 between the temporary pallet supports 112 and 114 for the loading elevator and an unloading elevator (not shown in FIG. 1). Perpendicular to each aisleway are several parallel row rails, e.g., an upper-level row rail 132, a middle-level row rail 134, and a lower-level row rail 136. Each level will typically have more than one row and row rail, FIG. 1 shows only one set for each level so the illustration does not become cluttered and hard to read. The aisle carts 126, 128, and 130 carry battery powered piggyback or row carts that run back and forth along a row. A battery powered row cart 138 is shown docked atop its aisle cart 126. An empty row cart 140 is shown docked atop its aisle cart 130.

In operation, each aisle cart 126, 128, and 130 is positioned in front of a designated row along the aisleway, and the row cart (e.g., 138) delivers, deposits, and retrieves product on pallets along the rows. Storage supports are provided along both sides of each row for storing the product and pallet at a designated position.

The movement of the aisle carts, row carts, elevators, turntables, extending forklifts, etc., is preferably computer controlled. This allows applications software to be in charge of all the material handling. This application software works in conjunction with inventory control software, such as AIM software available from TRW.

Position sensors are placed at strategic points to help inform the computer system as to the actual positions of the various moving components of the warehouse system. A scannable identification tag attached to each pallet that would uniquely identify the product being handled and any access or movement restrictions would be beneficial. Such identity tags are preferably used to track inventory, schedule storage locations, assist property security, schedule shipping, etc. The implementation of such a supervisory control and data acquisition (SCADA) system is straightforward and essentially quite conventional. So further description is unnecessary here. A critical aspect of the present invention includes the way of loading and unloading elevators, aisle carts, and row carts which are all interrelated and used to transport product through the system.

Figure 2:
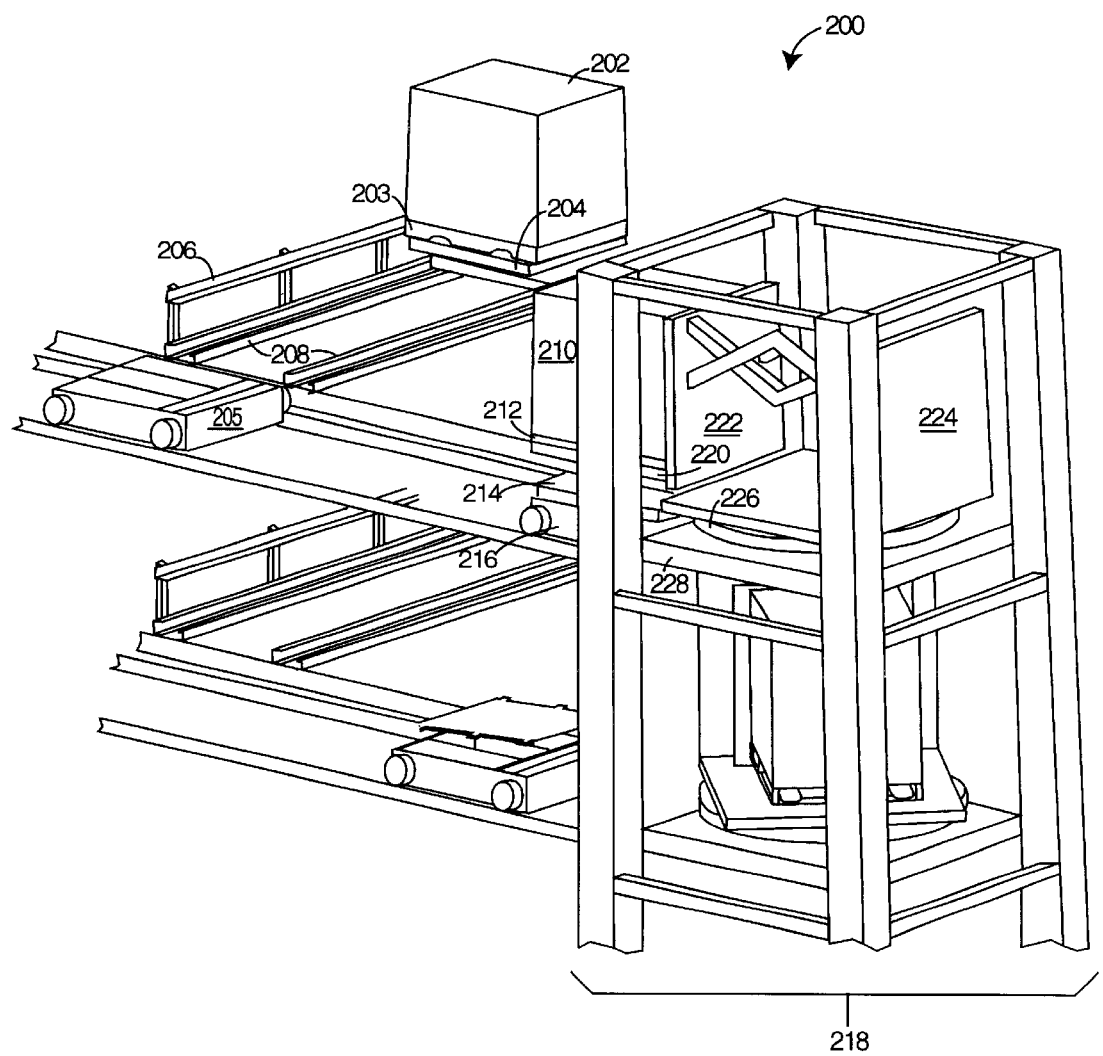
FIG. 2 is a perspective view of the internal material-transfer and storage portion of the warehouse system of FIG. 1.

FIG. 2 illustrates another portion of the warehouse system 200, especially that part concerned with transferring material on pallets between aisles and rows on multiple levels. The warehouse system 200 allows a product 202 on a standard pallet 203 to be carried along a row by a row cart 204 after it undocks from its position on top of an aisle cart 205.

In one embodiment of the present invention, a pair of pallet support rails 206 above and outside of a pair of row rails 208 allows the row cart 204 to drop off or pick up the product 202 and pallet 203. When the row is empty, the first unit of product 202 and pallet 203 is taken and deposited at the back position of the row. The next unit of product 202 and pallet 203 is deposited at the next position, and so on until the row is full of the same product. Each row can have from one to ten or more positions. The pair of pallet support rails 206 (only one is shown) are parallel and spaced such that they will support the pallet 203 between them. The row cart rolls off the aisle cart, proceeds to the proper position on the row and stops. The lifting device then retracts so that the pallet is now supported on the support rails 206. When retrieving the product 202 and pallet 203, the row cart 204 positions itself under the pallet and load, and then lifts the product 202 and pallet 203 up off the pallet support rails 206 before returning to its docking position on the aisle cart 205, which then moves toward an elevator and, for description purposes, becomes aisle cart 216.

In FIG. 2, a product 210 on a pallet 212 is being carried by a row cart 214 docked on top of an aisle cart 216. Such is brought to an unloading elevator 218 and deposited on a temporary support 220 by retraction of the row cart 214. The aisle cart 216 can then proceed to another assignment with the row cart 214 on top thereof. The product 210 and pallet 212 are positioned on the temporary support for an extending FLA 222 to reach out and retrieve product and pallet into the unloading elevator 218. The extending FLA 222 is attached to a rotating base 224, which is in turn supported on a turntable 226 and elevator car 228.

Figure 3:
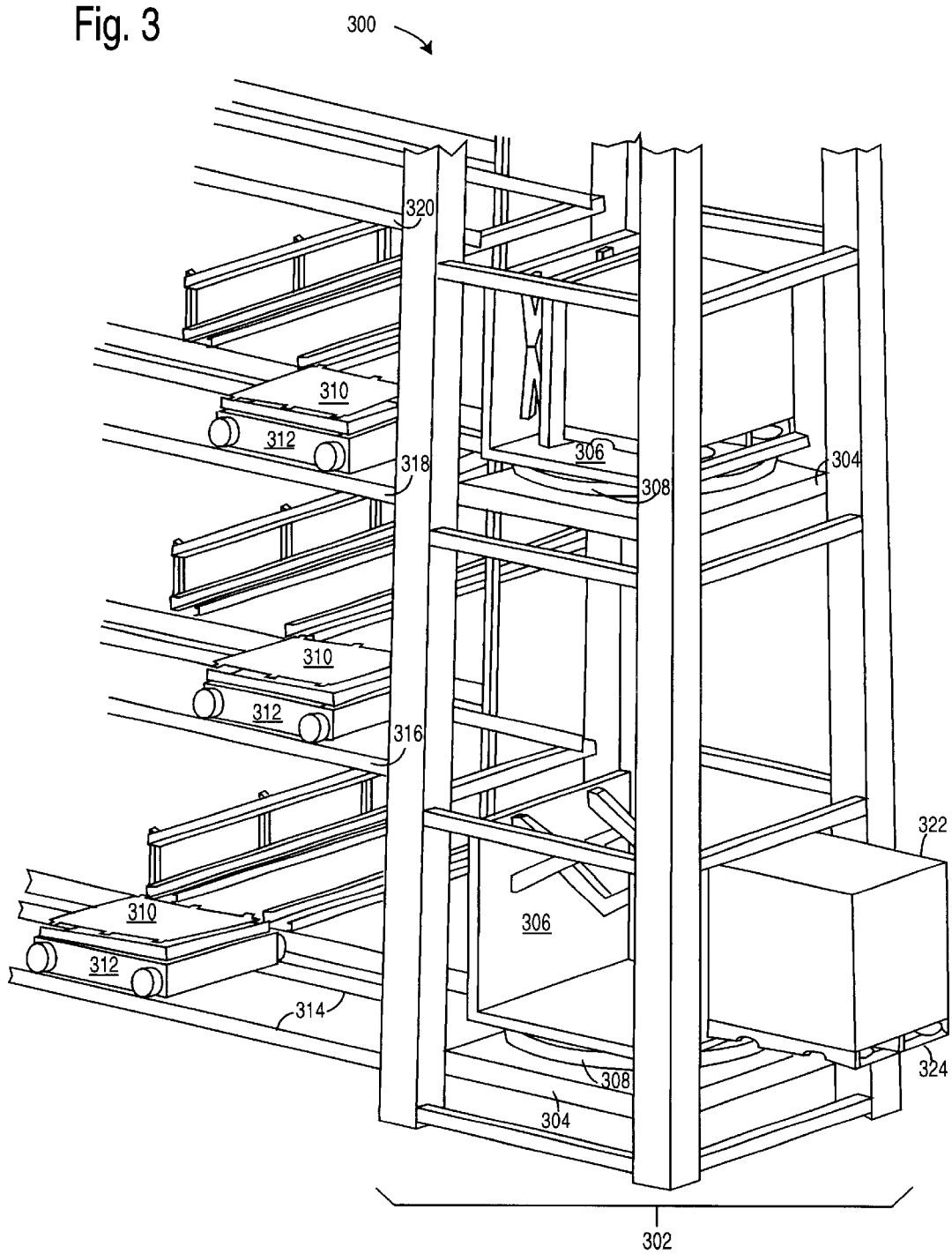
FIG. 3 is a perspective view of the unloading elevator and material-output portion of the warehouse system of FIG. 1.

FIG. 3 illustrates another portion of the warehouse system 300, especially that part concerned with unloading material on pallets out of the system. An unloading elevator 302 includes an elevator car 304 that transports product and pallet to the various levels. A rotating FLA 306 is carried on a turntable 308 on the elevator car 304. A row cart 310 on top of an aisle cart 312 rides on aisle rails 314, 316, 318, or 320, to deliver product on pallets to the unloading elevator 302. Once the product on pallets is retrieved onto the elevator car 304 by the rotating FLA 306, the turntable is spun around 90° to 180° so that loaded pallets can be presented to the dock staging system for shipment to any desired destination.

Figure 4:
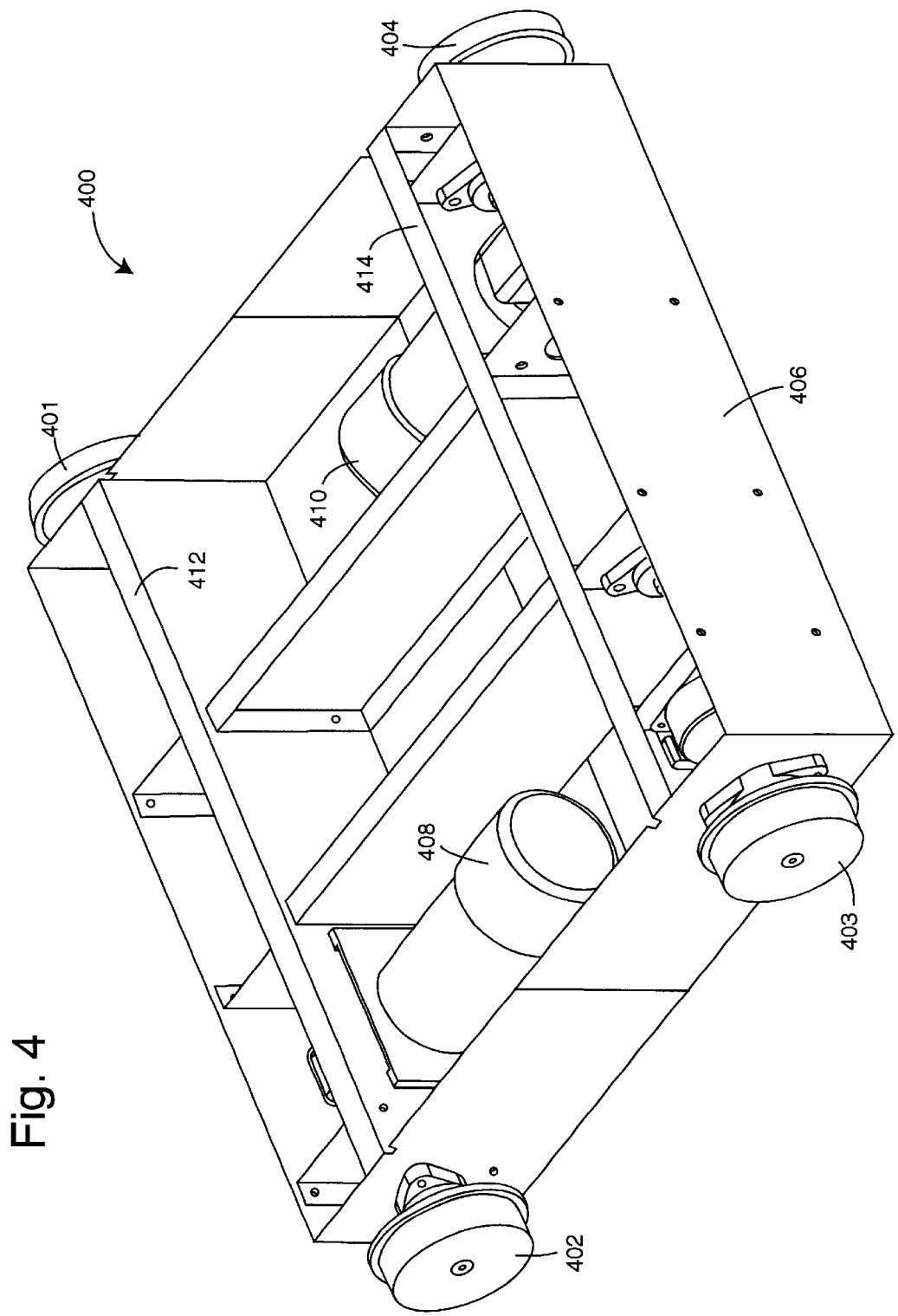
FIG. 4 is a perspective view of a rail trolley or aisle cart used in the warehouse system of FIG. 1.

FIG. 4 represents an aisle cart 400 similar to those shown in FIGS. 1–3. The aisle cart 400 includes a set of four wheels 401–404. These are attached with axles to a lower chassis 406 and ride on the aisle rails, e.g., 120, 122, and 124 (FIG. 1). A pair of electric motor and gear units 408 and 410 are mechanically connected to the four wheels 401–404 to drive the unit back and forth along the aisleway. A pair of rail sections 412 and 414 allow a row cart to roll on and off the top to one side or the other, albeit only when properly aligned with a row.

Figure 5:
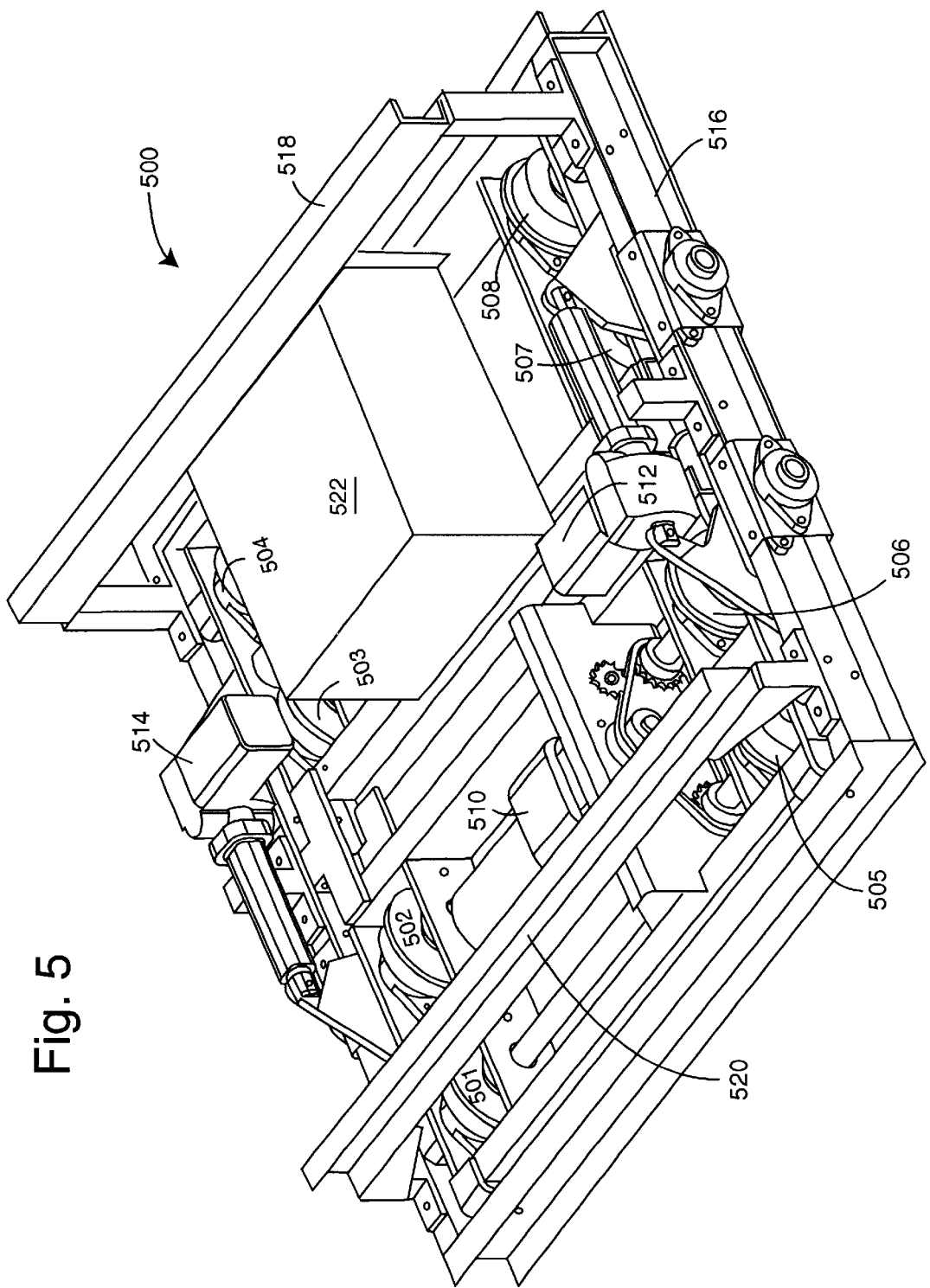
FIG. 5 is a perspective view of a piggyback carrier or row cart used in the warehouse system of FIG. 1 and that docks on top of the aisle cart of FIG. 4, and that travels in rows perpendicular to the aisles on each level.

FIG. 5 represents a row cart 500 similar to those shown in FIGS. 1–3. The row cart 500 includes a set of eight wheels 501–508. It is necessary to have the wheels in pairs to transcend the gap that occurs between the aisle cart and the row rails. An electric motor and gear unit 510 is mechanically connected to drive the wheels. In operation, the wheels 501–508 roll onto and off of the pair of rail sections 412 and 414 as shown in FIG. 4. A pair of motors 512 and 514 on the row cart elevate a pair of pallet supports 518 and 520 up or down to load and unload pallets. A power cable connects and disconnects as the row cart docks and undocks from the aisle cart. Its purpose is to charge the battery in the row cart and to give instructions to the row cart for its next task.

In general, embodiments of the present invention are such that pallets of product can be presented to an automated storage and retrieval system module at any level via a loading elevator for that module. A standard Grocery Manufacturers Association (GMA) pallet is used in this particular application but, the system could easily be designed for a pallet of another particular size. The pallet is loaded in an elevator by means of an FLA mounted inside the elevator that extends out of the elevator and retrieves that pallet from a supply conveyor, then returns the pallet to the elevator. Once in the elevator, the pallet is transported vertically (up or down) to the desired level.

An exemplary storage system designed for six levels has been illustrated herein. Alternative system embodiments of the present invention can have as few as two levels, and as many as eight or more levels.

When a pallet arrives at a desired level, its elevator automatically stops at just the right position. An FLA in the elevator car rotates toward the inside of the storage module. The pallet carried by the FLA is extended out just over a pair of pallet supports spaced as wide as the pallet. The forks on the FLA are set close enough together so they can move horizontally between the pallet supports. The bottom outside edges of the pallet are kept elevated slightly above the pallet supports so the fork extension and pallet load can operate without dragging. Once the forks are in proper position, a lifting mechanism in the elevator lowers the pallet onto the pallet supports to unload the FLA. The FLA can then be retracted back into the elevator.

The loading elevator then returns to the level where supplies are coming in to pick up its next pallet. As the elevator is moving between levels, the FLA simultaneously pivots to get ready for the next pickup from the outside.

Back at the level where the previous pallet was unloaded, a row cart carried on top of an aisle cart moves between the pallet supports that the pallet is resting on and stops precisely under the pallet. A lifting device on the row cart elevates the pallet from the pair of supports it was resting on. Such lifting device is included in the row cart, and a screw-type jacking device connected to a pair of pivoting arms has provided good results. This structure lifts-and-lowers the pallet from underneath.

In alternative embodiments of the present invention, hydraulic and/or electric stepping motors can be used as the lifting mechanism.

Once the pallet load has been lifted off the pallet supports by the row cart, a drive unit in the aisle cart can then transport the row cart and its load down the aisle to any designated row. The row cart then disembarks to travel on a selected row.

The row selected is determined by software in a computer system that controls the entire storage module. Sensors are included to help determine the exact locations of the carts on the aisles and rows.

The row carts are controlled by the application software via the aisle carts. The row carts are preferably powered by storage batteries that recharge when they are docked on the respective aisle carts. Each aisle cart is powered by an electrical power strip that runs along the side of the aisle tracks. Such electrical power strip also provides a connection of the aisle carts to the computer system.

Row carts move perpendicular to the direction of the aisle carts on "row tracks". In one embodiment of the present invention, row tracks were placed on opposite sides of the aisles and were long enough to store four pallets, e.g., in four positions. The depth of rows is determined by the number of "same pallets" that are being supplied to the module. For example, if the normal inventory of a particular product in the system is normally only three units, then each row should be designed or stocked no deeper that three pallets.

If there are large numbers of a particular product, a logistical advantage can be realized by distributing the product inventory throughout the module system. More carts can be used at the same time to move such product in-and-out of the module. In cases where there are fifty to one-hundred pallets of the same product in a module, four-pallet-deep rows made for good distribution of the product. Accessibility is thereby improved.

A particular location along a row is a "position". Positions must be loaded in sequence, e.g., starting with the position furthest from the aisle. Each position is filled sequentially until the whole row is full. Such physical arrangement makes the position closest to the aisle the last to be loaded and the first that must be unloaded.

A loaded row cart is instructed by the computer system to find a designated position. The lifting device on the row cart retracts, unloading the pallet onto a static-type racking system with rails spaced wide enough apart to allow the row cart to run in between it. The unloaded row cart returns to dock on the aisle cart for a next assignment and battery recharging.

An inventory control software system is preferably included to keep track of where the pallets are. Such computer system will know to go to a particular level, aisle, row, and position for the desired pallet. An aisle cart at the proper level in the system is sent to the row in which the desired pallet is located. If other pallets are in the way, the positions must also be sequentially unloaded. That means starting with the position closest to the aisle, and working out away from the aisle. The row cart approaches with its lifting device lowered. Once positioned under the desired pallet, the lifting device is activated and the pallet is lifted off the supports it was stored on.

Once the lifting device is fully raised, the row cart drive unit activates and returns the row cart with a pallet to the aisle cart where, it starts its recharge cycle and receives further instructions. The aisle cart then transports the pallet and row cart to the unloading elevator which is placed on the opposite end of the module from the loading elevator, unless a universal elevator is being used. When the aisle cart reaches the unloading elevator transfer position, the aisle cart stops in the proper position. The lifting device on the row cart then retracts, setting the pallet on a pair of supports similar to the ones located at the loading end of the module and again, allowing the cart to drive in between them.

Once the row cart is lowered and the pallet is placed on its supports, the aisle cart then can travel to its next assignment. The pallet sits in that position until the unloading elevator FLA is positioned directly across from it. Once the elevator is in position, the FLA extends out of the unloading elevator in between the rails the pallet is supported on and enters the pallet opening, the same as forklift forks would. After it is positioned in the pallet, the lifting mechanism in the elevator travels up, moving the fork attachment upward, raising the pallet off the rails. The fork attachment then retracts into the elevator repositioning the pallet inside the elevator. Once the pallet is in the elevator, the elevator then vertically moves the pallet to the staging level. While the elevator is moving to the staging level, the fork attachment is pivoted, similar to the action in the loading elevator.

This positions the FLA for an outward movement. Once in position at the staging level, the FLA extends out slightly above and over a powered conveyor. The elevator then lowers the FLA, thus lowering the pallet on to the powered conveyor. The FLA then retracts in to the elevator and travels to its next assignment. During the coarse of travel to its next assignment, the FLA is rotated to position itself for the next pallet to be retrieved from the module.

Figure 6:
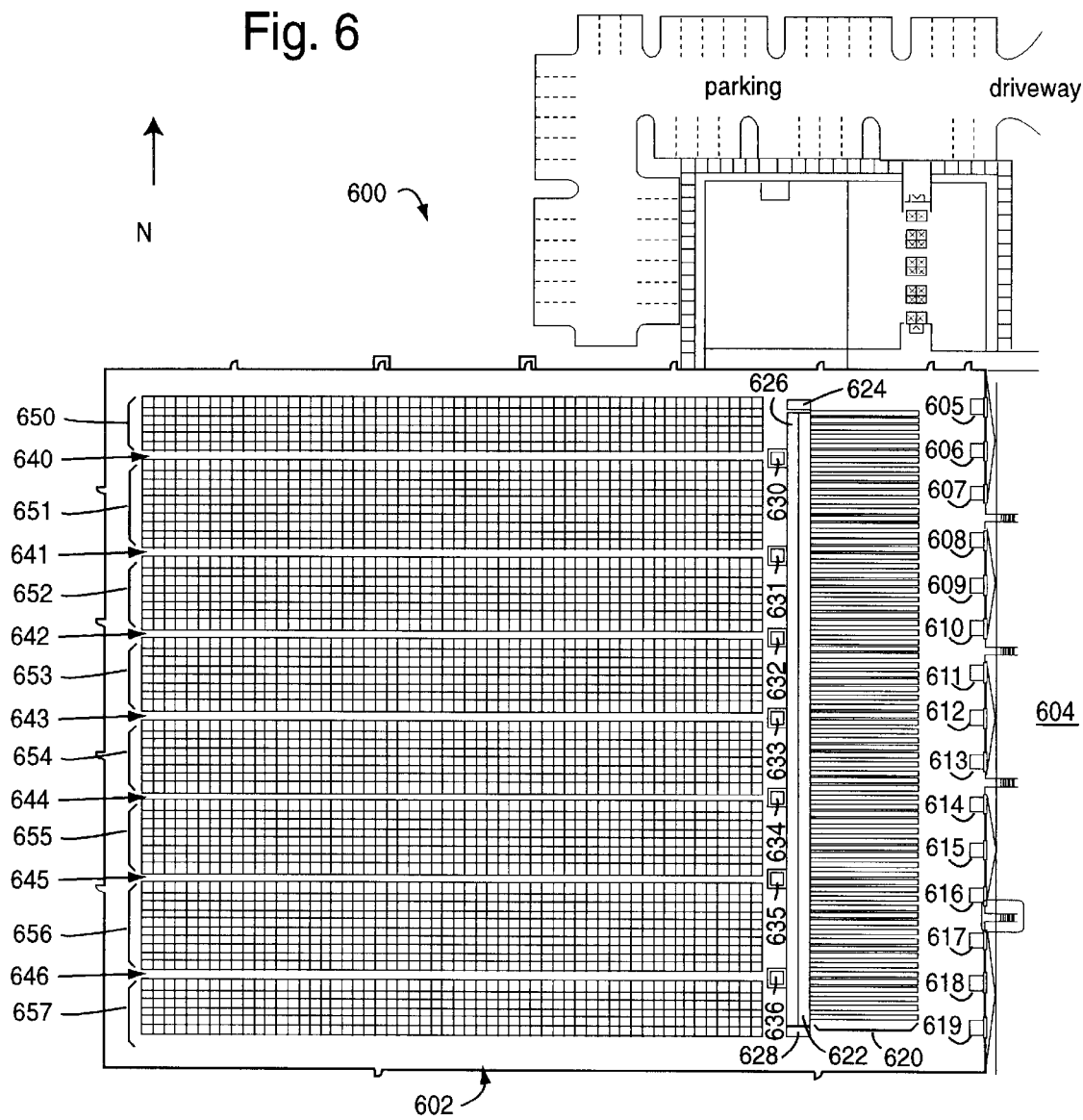
FIG. 6 is a top plan view of an entire warehouse system.

FIG. 6 shows an entire warehouse 600 in plan view. An exterior wall 602 encloses a multi-level storage module. A shipping and receiving area 604 provides for trucks to dock along a series of doors 605–619. Inside the building, these face a number of parallel staging conveyers 620. Pallets of material coming in from the trucks through the dock doors are sent up a staging conveyor to a south running rail track 622. When the pallets reach the south end they can be transferred across on a south transfer rail 628. These are shuttled west a short distance so they can catch a north running rail track 626. Similarly, any pallets that reach the north end can be recirculated by transferring across on a north transfer rail 624. In effect, a clockwise circulation system is created so the pallets can be presented to any number of elevators 630–636. A counter-clockwise circulation would, of course, be an alternative.

A corresponding aisle 640–646 faces each elevator 630–636. Material on pallets that ride by on the north transfer rail 626 can be retracted by any pivoting extending FLA in any of the elevators 630–636. Such FLA in the elevators are like those described in FIGS. 1–3. If the pallet is not going to be lifted to another floor level, the FLA can simply rotate and present the load to an aisle cart running in aisles 640–646. Each aisle can intersect up to fifty or more rows. Each aisle divides a block 650–657 that can be from four to twelve positions or more deep. In FIG. 6, blocks 650 and 657 are six positions deep and can only be accessed by one aisle 640 or 646. The other blocks 651–656 can be accessed by an aisle 640–646 on either side.

Figure 7:
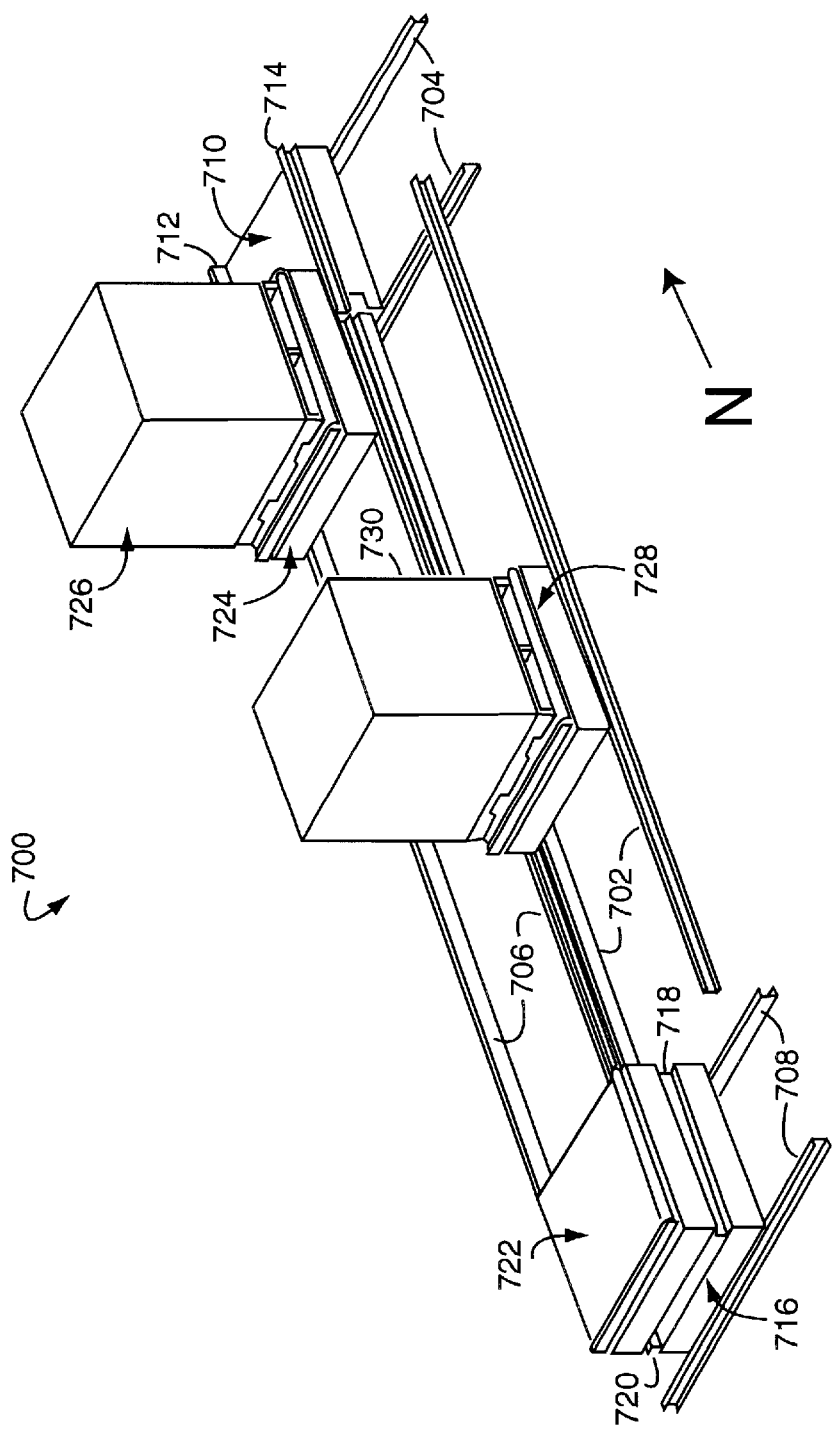
FIG. 7 is a perspective view of a pallet carousel system which delivers a pallet to a designated staging position.

FIG. 7 illustrates a carousel system 700 similar to south running rail track 622 (FIG. 6), north transfer rail 624 (FIG. 6), north running rail track 626 (FIG. 6), and south transfer rail 628 (FIG. 6). FIG. 7 provides more detail on one way to implement the pallet circulation. A "south" running track pair 702 allows carts to run in one direction toward a "south" transfer track pair 708. A "north" running track pair 706 allows the same carts to run in the other direction toward a "north" transfer track pair 704.

A north movable track carrier 710 shuttles between the south and north track pairs 702 and 706 at their northern ends. Such carries a pair of rail sections 712 and 714 that can be exactly aligned with either of the south and north track pairs 702 and 706 at their northern ends. The north movable track carrier 710 is positioned to receive carts from the north track pair 706, and to launch such carts onto the south track pair 702. The north movable track carrier 710 includes a drive unit to assist with the shuttle back and forth on the north transfer track pair 704.

A south movable track carrier 716 shuttles between the south and north track pairs 702 and 706 at their southern ends. It includes a pair of rail sections 718 and 720 that can be exactly aligned with either of the south and north track pairs 702 and 706 at their southern ends. The south movable track carrier 716 is positioned to receive carts from the south track pair 702, and to launch such carts back onto the north track pair 706. The south movable track carrier 716 includes a drive unit to assist with the shuttle back and forth on the south transfer track pair 708.

An empty conveyer cart 722 is shown riding the south movable track carrier 716. It is being recirculated to travel north again on the north track pair 706. Such cart 722 is similar to the aisle carts described elsewhere herein, but do not require a "row" cart riding piggyback. Other machinery is used to pickup and deposit pallets of material onto the top on the conveyor cart. For example, each conveyer cart can include a self-contained chain conveyer which can move a pallet in either the east or west direction.

Another conveyor cart 724 is shown with a palleted load 726 just moving onto the north movable track carrier 710 from the north track pair 706. A third conveyor cart 728 is shown with a palleted load 730 moving south along the south track pair 702.

In summary, the powered conveyor is positioned beside the northbound tracks of the carousel system.

A cart similar to the aisle cart used inside the module and outfitted with a chain conveyor on top instead of a top cart runs on the carousel. Powered rollers or a belt conveyor could also be used in other applications.

An unloading cart positions itself directly in front of a designated unloading or universal elevator. Between the elevator and the cart is a staging area that holds one pallet. In this case, the staging area consists of a set of chain conveyors. In other applications, the staging area could be a belt conveyor or powered rollers. Once the cart is in position directly across from the waiting pallet, the staging chain conveyors and another set of chain conveyors on the staging cart start up simultaneously to convey the pallet from the staging area onto the awaiting cart. Once loaded, the cart then moves in a northerly direction (in this application) along a set of rails, until it reaches the far north end of the carousel. A carousel may service one or multiple elevators from various modules. Upon reaching the north end of the track on the northbound track, the cart moves onto a section of movable track. Once the cart is positioned on the movable track, it stops. A shifting device then shifts the movable track section and aligns it with a second set of stationary tracks that are further outside the module and parallel to the first set of tracks. After it is aligned, the cart is then able to move off the section of movable track onto the stationary track in a southerly direction. The cart then travels to a position predetermined by the computer system which lines up with one of several "walking conveyors". This position is determined as a result of which dock door the pallet is to be loaded out of. Once in position, the chain conveyors on the cart and walking conveyor start up simultaneously and convey the pallet from the cart to the walking conveyor. It is also feasible to use roll through conveyors, powered rollers, chain conveyors, belt conveyors or gravity rolls in place of the walking conveyors.

After the cart has unloaded its pallet, it travels to the southern most end of the carousel where it again positions itself onto yet another section of movable track. Once in position, the cart is then shifted back to align with the northbound track. The cart is then able to travel to its next assignment. On the carousel of north and southbound tracks, the cart(s) is essentially moving in a circle. Typically, a number of carts are used to run on the carousel track. This allows for increased capacity through the system. A positioning device along with the computer system controls these carts and their relation to each other to avoid collisions and assure a smooth flow of pallets. The purpose of these delivery systems (in this case walking conveyors) is to stage pallets that are to be loaded on outbound trucks in a specific fashion and at a particular dock door. The walking conveyor used for this particular installation will be seven pallets deep. This is normally one-third of a truckload since there are normally twenty-one pallets on a full truck. Consequently, it will require three lanes of walking conveyor to fill a full truckload.

Many of the individual components and parts described here are conventional and need not be described further. Ordinary purchasing, engineering and mechanical skills are needed to acquire, build and maintain embodiments of the present invention.

It is also possible to load and unload the module through one elevator instead of two. Such a "universal elevator" is located where the unloading elevator is in the above described "two elevator" module. The staging would still be done on level one so as to service the docks, although it is possible to stage on multiple levels. The supply of pallets to the module for loading purposes into the module would be accomplished at some level other than level one and that supply system would be located directly over the staging track and next to the universal elevator. In this scenario, the elevator would function the same as the two elevator system but, have twice as many "moves" to make, thus, creating a heavier duty cycle for the single elevator concept. The moves would be the same as for two elevators, the duties just combined into one elevator.

There may be a few advantages for the single elevator system. First of all, there is a lower cost in the system by eliminating one elevator per module. Second, most of the "critical" machinery is on one end of the system making it easier to monitor and service. Another advantage is that it will normally allow for a higher density of product in a given space. A final advantage would be if the pallets supplied to the system are being trucked in, all forklift operations would be in the same dock area. Some of the reasons for choosing the two elevator system would be higher throughput, and location of supply towards the rear of the system.

An automated warehouse system embodiment of the present invention typically comprises a tall warehouse building with at least one freight elevator. One such freight elevator and shaft automatically accepts incoming material on pallets. A rotating forklift permanently mounted inside the loading elevator can extend its forks to reach out and bring in material loaded on a standard pallet. Once inside the car of the loading elevator, the rotating forklift is spun around to face inside openings on the various floors of the warehouse. When the elevator car arrives at a particular floor, the rotating forklift deposits the material on the pallet on a temporary support just outside the elevator. Each floor has an aisle cart that shuttles along an aisleway between temporary pallet supports for both the loading elevator and an unloading elevator. Each aisleway is intersected by several perpendicular row rails. The rail trolley carries a battery powered row cart that can run back and forth along the rows. The aisle cart is parked at the appropriate row along the aisleway, and the piggyback carrier or row cart carries, deposits, and picks up product on pallets in the slots. Storage slots are provided all along both sides of each row, so the row itself provides storage locations front to rear.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A method for automatic storage and retrieval in an automated warehouse, the method comprising the steps of:

reaching out with a forklift-like attachment from a first elevator to retrieve a palleted item;

transporting and rotating said palleted item in a first elevator to an assigned level in a multi-story warehouse;

depositing said palleted item from said first elevator on said assigned level; carrying carrying said palleted item down an aisleway on a row cart docked on an aisle cart to any one of a number of rows that intersect said aisleway;

moving said row cart completely off said aisle cart down one of said number of rows;

depositing said palleted item along said one row; and returning said row cart to a docking position on top of said aisle cart.

2. The method of claim 1, further comprising the steps of:

picking up said palletized item with said row cart from a place it was deposited along any row, off any aisle, on any level, and in said multi-story warehouse;

returning said row cart with said palleted item to a position on top of said aisle cart;

running said aisle cart and row cart with said palleted item down said aisleway to a second elevator;

dropping-off said item proximate to said second elevator;

lowering said pallet item with said second elevator; and outputting said palletized item from said multi-story warehouse.

3. The method of claim 1, the step of depositing includes reaching out with a forklift-like attachment from said first elevator to outplace said palleted item.

4. The method of claim 2, wherein the step of lowering includes reaching out with a forklift-like attachment from said second elevator to draw in said palleted item.

5. The method of claim 2, wherein the step of outputting includes reaching out with a forklift-like attachment from said second elevator to outplace said palleted item.

6. The method of claim 2, further including the steps of:

moving said palleted items between a truck-dock door and a walking conveyer;

shuffling said palleted items on a carousel system between said walking conveyor and said second elevator.

7. The method of claim 6, wherein:

the step of shuffling is such that said carousel system includes two sets of parallel adjacent tracks and a transfer track at each pair of ends, and said palleted items circulate around.

8. The method of claim 7, wherein:

the step of shuffling is such that at least one conveyor cart rides said carousel system on said parallel adjacent tracks and said transfer track.

9. The method of claim 8, wherein:

the step of shuffling is such that said conveyor carts include an unloading and loading device.

10. A method for automatic storage and retrieval in an automated warehouse, the method comprising the steps of:

accepting a palleted item to-be-stored by reaching out with a forklift-like attachment from a first elevator to draw in a palleted item;

transporting said palleted item in a first elevator to an assigned level in a multi-story warehouse;

rotating said palleted item within said first elevator for presentation inside a storage module;

depositing said palleted item on said assigned level;

carrying said palleted item down an aisleway on a row cart docked on an aisle cart to any one of a member of rows that intersect said aisleway;

off-loading a row cart that carries said palleted item off said aisle cart down one of said number of rows;

depositing said palleted item at a designated position in said one row;

returning said row cart to a position on top of said aisle cart;

picking up a second palletized item with said row cart from a place it was deposited along any row, off any aisle, on the same level in said multi-story warehouse;

returning said row cart with said second palleted item to a position on top of said aisle cart;

running said aisle cart and row cart with said second palleted item down said aisleway to a second elevator;

dropping-off said second item proximate to said second elevator;

retrieving said second pallet item with said second elevator by reaching out with a forklift-like attachment to draw in said second palleted item;

rotating said second palleted item within said second elevator for presentation outside a storage module;

outputting said second palletized item from said multi-story warehouse by reaching out with a forklift-like attachment from said second elevator to outplace said second palleted item;

moving said second palleted item between a truck-dock door and a walking conveyer; and shuffling said second palleted item on a carousel system between said walking conveyor and said first elevator, wherein said carousel system includes two sets of parallel adjacent tracks and transfer track at each pair of ends, and said palleted items circulate around, and at least one conveyor cart rides said carousel system on said parallel adjacent tracks and said transfer track, and wherein said conveyor carts include an unloading and loading device.

11. An automated warehouse, comprising:

means for accepting a palleted item to-be-stored by reaching out with a forklift-like attachment from a first elevator to draw in a palleted item;

means for transporting said palleted item in a first elevator to an assigned level in a multi-story warehouse;

means for pivoting said palleted item within said first elevator for presentation inside a storage module;

means for depositing said palleted item on said assigned level;

means for carrying said palleted item down an aisleway on a row cart docked on an aisle cart to any one of a number of rows that intersect said aisleway;

means for off-loading a row cart that carries said palleted item off said aisle cart down one of said number of rows;

means for depositing said palleted item at a designated position in said one row;

means for returning said row cart to a position on top of said aisle cart;

means for picking up a second palletized item with said row cart from a place it was deposited along any row, off any aisle, on the same level in said multi-story warehouse;

means for returning said aisle cart and row cart with said second palleted item to a position on top of said aisle cart;

means for returning said row cart with said second palleted item down said aisleway to a second elevator;

means for dropping-off said second item proximate to said second elevator;

means for retrieving said second pallet item with said second elevator by reaching out with a forklift-like attachment to draw in said second palleted item;

means for rotating said second palleted item within said second elevator for presentation outside a storage module;

means for outputting said second palletized item from said multi-story warehouse by reaching out with a forklift-like attachment from said second elevator to outplace said second palleted item;

means for moving said second palleted item between a truck-dock door and a walking conveyer; and means for shuffling said second palleted item on a carousel system between said walking conveyer and said first elevator, wherein said carousel system includes two sets of parallel adjacent tracks and a transfer track at each pair of ends, and said palleted items circulate around, and at least one conveyor cart rides said carousel system on said parallel adjacent tracks and said transfer track, and wherein said conveyor carts include an unloading and loading device.

* * * * *